United States Patent [19]

Hata et al.

[11] Patent Number: 4,830,580

[45] Date of Patent: May 16, 1989

[54] TWO-STAGE AIR COMPRESSOR UNIT

[75] Inventors: Yasuhisa Hata, Akashi; Satoshi Ogura, Kobe, both of Japan

[73] Assignee: Nippon Air Brake Co., Ltd., Kobe, Japan

[21] Appl. No.: 128,768

[22] Filed: Dec. 4, 1987

Related U.S. Application Data

[63] Continuation of Ser. No. 836,031, Mar. 4, 1986, abandoned.

[30] Foreign Application Priority Data

Mar. 4, 1985 [JP] Japan .................. 60-30435[U]

[51] Int. Cl.$^4$ ............................................. F04B 25/00
[52] U.S. Cl. ................................................ 417/243
[58] Field of Search ............... 417/243, 369, 423 H; 418/101

[56] References Cited

U.S. PATENT DOCUMENTS

| | | | |
|---|---|---|---|
| 1,151,278 | 8/1915 | Laurin | 417/243 X |
| 1,805,101 | 5/1931 | Modine | 417/243 X |
| 2,150,912 | 3/1939 | Clapp | 417/243 |
| 2,186,492 | 1/1940 | Paget | 417/243 |
| 3,153,508 | 10/1964 | Sawyer | 417/243 |
| 3,644,054 | 2/1972 | Pilarczyk | 417/243 X |
| 3,658,442 | 4/1972 | Heitmann et al. | 417/243 |
| 4,125,345 | 11/1978 | Yoshinaga et al. | 417/243 |

FOREIGN PATENT DOCUMENTS 546678  7/1942  United Kingdom ............... 417/243

Primary Examiner—Carlton R. Croyle
Assistant Examiner—Eugene L. Szczecina, Jr.
Attorney, Agent, or Firm—J. B. Sotak

[57] ABSTRACT

A two-stage air compressor unit having an intercooler and aftercooler placed in side by side relationship to form an integral unit which is cooled by forced air blown by a motor driven fan and which has the inlet and outlet parts located in such a manner that little, if any, heat transfer occurs between the intercooler and the aftercooler so that greater cooling efficiency is realized.

6 Claims, 4 Drawing Sheets

TWO-STAGE AIR COMPRESSOR UNIT

This is a continuation of co-pending application Ser. No. 836,031, filed Mar. 4, 1986, now abandoned.

FIELD OF THE INVENTION

This invention relates to a two-stage air compressor unit which is suspended from the underside of the floor of a railroad car to be used as the air source for the brake system and which includes a low pressure cylinder, a high pressure cylinder, an integral intercooler and aftercooler which are cooled by forced air blown by a motor-driven fan.

BACKGROUND OF THE INVENTION

It will be noted that an explanation of the two-stage air compressor unit of the prior art type will be made with reference to FIGS. 4a, 4b, and 4c of the drawings. The two-stage compressing air compressor unit of the prior art consists mainly of a motor 4, a two-stage compressor 14 driven by the motor 4, an intercooler 1, and an aftercooler 2. The crankshaft 15 of the two-stage compressor 14 described above is connected to the output shaft 11 of the motor 4 via coupling 16 so that it drives the low pressure cylinder 7 and the high pressure cylinder 8 to compress the air at low and high pressure, respectively. A central protective housing 17 covers the outside of the coupling 16 and shields it from being touched by hand or other objects while it is in rotation. At the same time, the protective covering 17 connects the two-stage compressor 14 to the motor 4. A suction dust filter 18 and a suction muffler 19 are also installed on the respective sides of the central hollow cover 17. The above-mentioned intercooler 1 is between the outlet port 7b of the low pressure cylinder 7 of the two-stage compressor 14 and the inlet port 8a of the high pressure cylinder 8. The air passing through the suction inlet port 7a is compressed at the low pressure cylinder 7 and the higher temperature air is conducted from the inlet port 1a. After some of it is cooled, it leaves via exit port 1b to the suction inlet port 8a of the high pressure cylinder 8. Since the cooling is done by natural heat conduction, the intercooler 1 is located in the good air flow position which is the lower part of or under the two-stage compressor 14.

The compressed air which exits the outlet port 8b of the high pressure cylinder 8 is introduced from the inlet port 2a into the aftercooler 2 which is force air cooled. It is then discharged from the exit port 2b to the brake system of the car which is not shown in FIGS. 4a, 4b, and 4c. Since the cooling is done by the air flow which is put in motion by rotation of the fan 6 which is carried by the other end of shaft 5 of the motor 4, the fan 6 is located on the remote side of the shaft 5 of the motor 4. To install such a two-stage compressing air compressor unit of the prior art underneath the car floor, the suspension pieces 20 are fixed on the upper part of the motor 4 and the two-stage compressor 14. These suspension pieces are bolted to the underside of the car floor with the interposition of a resilient bumper material 21, such as, a vibration-absorbing flexible washer. As shown in FIG. 4c, there are two low pressure cylinders 7 as well as two high pressure cylinders 8. The suctioned air which passes through the suction dust filter 18 and the suction muffler 19 is introduced into each low pressure cylinder 7 from each inlet 7a and is compressed to approximately 2.5 Kg/cm2. Compressed air is conveyed from the outlet ports 7b to the inlet ports 1a of the intercooler 1. From there, it is conducted from each inlet ports 8a and is compressed to approximately 9.0 Kg/cm2. Then, the high pressure compressed air passes through each outlet port 8b and is conveyed to the inlet ports 2a of the aftercooler 2. The aftercooler 2 is force air cooled to not more than 10 degrees higher than the outside air temperature. The compressed air is then supplied to the brake system and other equipment of the railroad car.

Since the two-stage compressed air compressor of the prior art uses natural cooling, the intercooler must be extremely large so that it takes up a great deal of space underneath the car and is expensive to manufacture. Also, the natural cooling intercooler is installed in the vicinity of the two-stage compressor, from which it can easily absorb heat so that the effective cooling capacity of the intercooler decreases which means a loss in energy efficiency. Also, because of its insufficient cooling capacity, the temperature of the compressor tends to rise so that the lubricating oil deteriorates and causes wear of the metal moving parts and an increase in oil consumption results, which makes maintenance and repair operations more difficult.

OBJECTS AND SUMMARY OF THE INVENTION

In the structure of the present invention, the cooling units which include the intercooler and the aftercooler are placed in side by side relationship so that the direction of air flow of each of the inlet and outlet ports is the same and combined into one piece, is installed on the side of the counter shaft of the motor, and the fan, which is fixed on the counter shaft of the motor, is placed between the motor and cooler unit, and the cooler unit is forcecooled by this fan.

As described above, the intercooler and the aftercooler are placed side by side relationship to form a unitary cooler unit. The cooling unit is installed on the outboard end of the drive motor, so that forced air is driven by a fan which is fixed or mounted on the end of the motor shaft. Thus, forced air passes the entire unit so that the cooling capacity of the intercooler is greatly improved. Also, since the unit uses forced cooling, the size of the intercooler can be dramatically reduced. In addition, since air flow of the inlet and outlet ports of the intercooler and the aftercooler are in the same direction, they do not tend to absorb any heat from each other.

In accordance with the present invention, there is provided a two-stage air compressor unit comprising an intercooler and an aftercooler placed in side by side relationship to each other, the inlets and outlets of the intercooler and aftercooler are oriented in the same direction, the intercooler and aftercooler are combined into one piece as an integral cooling unit, the cooler unit is installed on the outboard side of the motor and is force air cooled by a fan driven by the motor, the fan is fixed to the driveshaft of the motor, a compressor unit is coupled with the motor, the compressor unit includes a low pressure cylinder and a high pressure cylinder, the intercooler is connected to the outlet port of the low pressure cylinder and the suction inlet port of the high pressure cylinder, and the aftercooler is connected to the outlet port of the high pressure cylinder to provide a source of high pressure air.

BRIEF DESCRIPTION OF THE DRAWINGS

The above objects and other attendant features and advantages of the present invention will become more readily apparent and understood when considered in conjunction with the detailed description and the accompanying drawings, wherein:

FIG. 1a is a top plan view of the compressor unit. FIG. 1b is a front side elevational view of the compressor unit. FIG. 1c is a front right end view of the compressor unit.

FIG. 2a is a top plan view of the compressor unit. FIG. 2a is a front side elevational view of the compressor unit. FIG. 2c shows the right end view of the compressor unit.

FIG. 3a is a top plan view of the compressor unit. FIG. 3b is a front side view of the compressor unit. FIG. 3c is a right end view of the compressor unit.

FIG. 4a is a top plan view of the compressor. FIG. 4b is a front side elevational view of the compressor unit. FIG. 4c is a schematic circuit diagram of the piping and air flow of the embodiment according to the prior art and of one embodiment of the subject invention.

DETAILED DESCRIPTION OF THE INVENTION

The following is an explanation of three actual embodiments of this invention with reference to FIGS. 1a-1c, 2a-2c and 3a-3c. The components which are identical in the various embodiments of the drawings are characterized with the same reference numbers and some of the repeated or detailed explanations are omitted for the purpose of convenience.

Figure 1A:
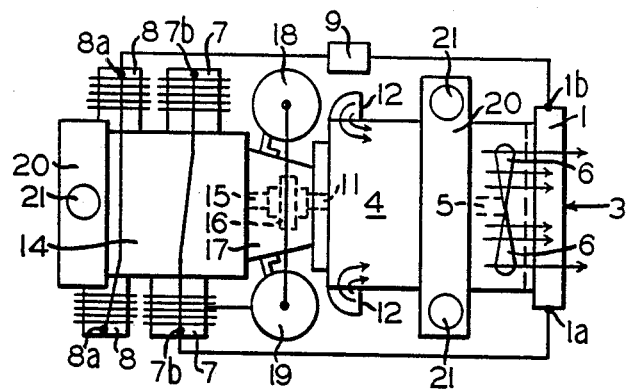
FIGS. 1a through 1c illustrate a first embodiment of a two-stage compressor unit of the subject invention.
Figure 1B:
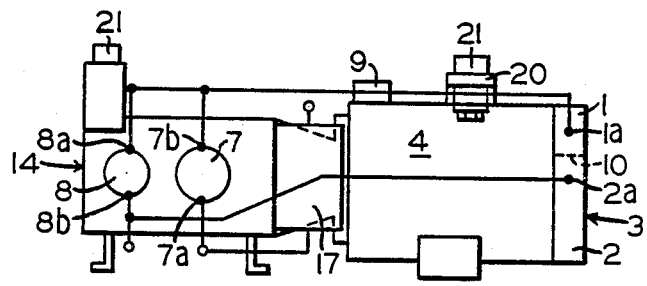
Figure 1C:
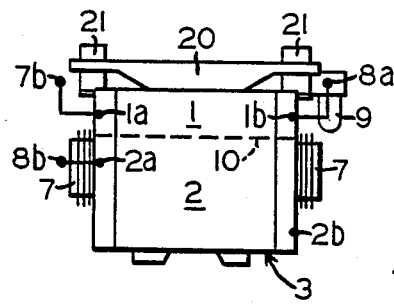
Figure 2A:
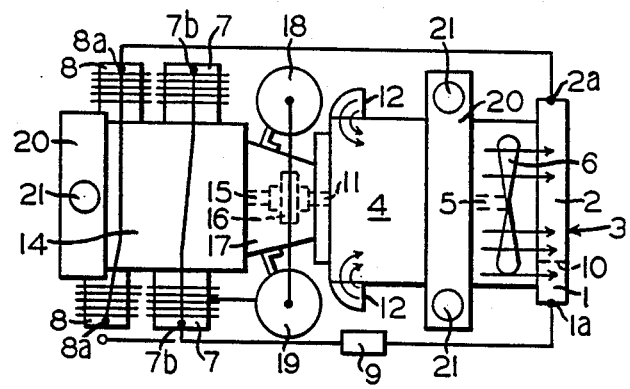
FIGS. 2a through 2c illustrate a second embodiment of a two-stage compressor unit of the subject invention.
Figure 2B:
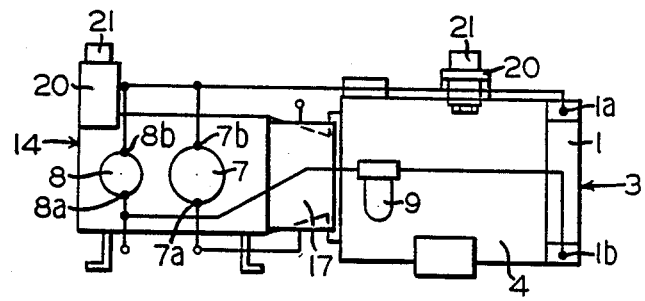
Figure 2C:
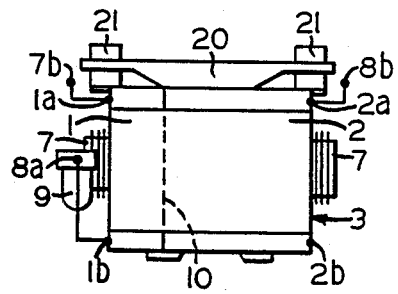
Figure 3A:
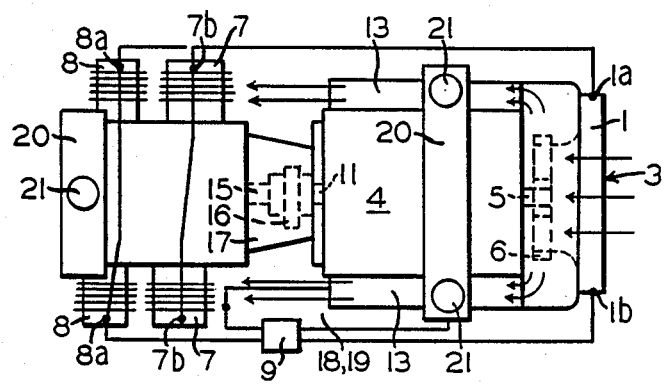
FIGS. 3a through 3c illustrate the third variation or embodiment of the two-stage compressor unit of the invention.
Figure 3B:
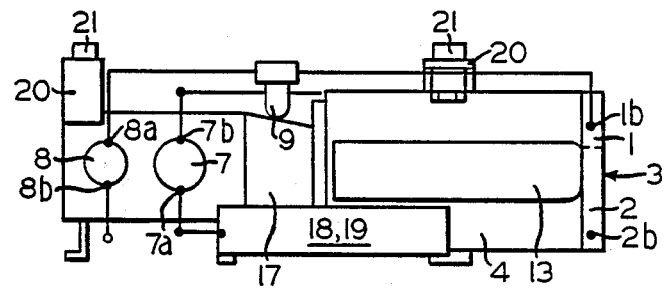
Figure 3C:
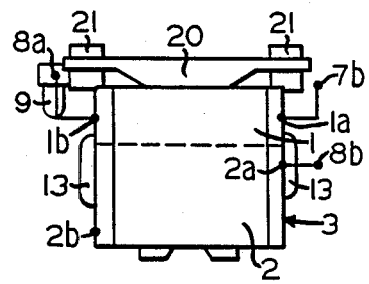
Figure 4A:
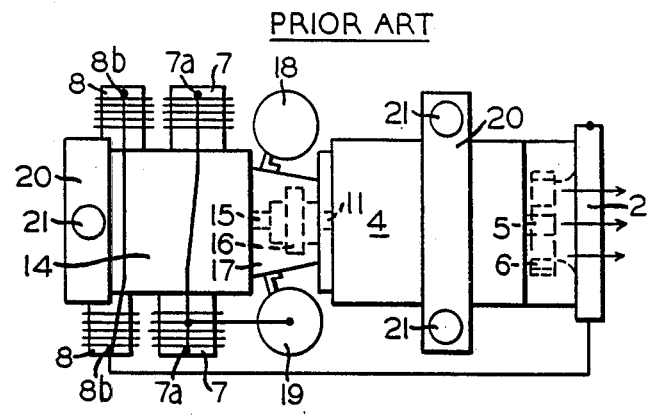
FIGS. 4a through 4c illustrate the previous type of a compressor embodiment of the prior art.
Figure 4B:
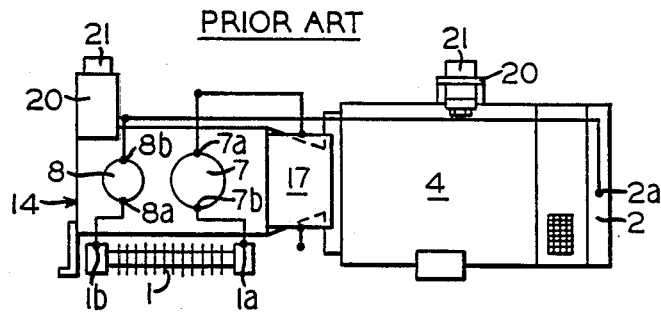
Figure 4C:
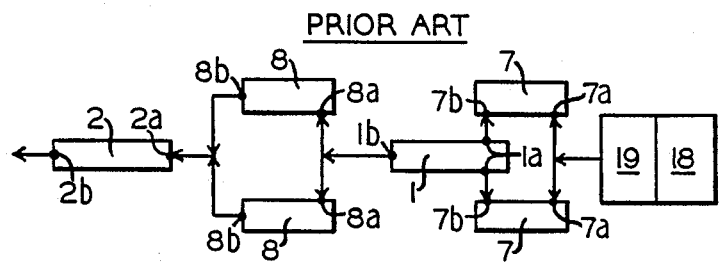

Referring now to the drawings, it will be seen that FIGS. 1a through 1c illustrate the first preferred embodiment of the two-stage air compressor unit of this invention, FIGS. 2a through 2c illustrate the second preferred embodiment of the two-stage air compressor unit of this invention, and FIGS. 3a through 3c illustrate the third preferred embodiment of the two-stage air compressor unit of this invention.

It will be seen that in each of the actual embodiments, the inventive concept which differs from the above-mentioned prior art arrangement, is the fact that the intercooler 1 and the aftercooler 2 are placed side by side relationship or in tandem in such a way that the direction of air flow through each inlet and outlet port is the same, and the two coolers are combined to form a single integral cooler unit 3. Cooler unit 3 is installed on the outboard side of the drive shaft 5 of the motor 4. It will be seen that the fan 6 is fixed or mounted on the end of the drive shaft 5 of the motor 4 and is located between the motor 4 and the cooler unit 3. In the first embodiment, the placement of the intercooler 1 and the aftercooler 2 which form the integral cooler unit 3 are situated in an up and down position, respectively. As shown, in FIG. 1c, the intercooler 1 is situated above and the aftercooler 2 is situated below to form the integral cooler unit 3.

As shown, in FIGS. 2a-2c of the second preferred embodiment of the subject invention, the intercooler 1 is placed on the left side and the aftercooler 2 is placed on the right side of the two-stage compressor unit.

In reviewing the third actual embodiment of FIGS. 3a-3c, it will be seen the direction of air moved by the fan 6 through the cooler unit 3 is opposite to that of the first and second embodiments of FIGS. 1a-1c and 2a-2c.

First, in the embodiment shown in FIGS. 1a-1c, the compressed air is introduced from inlet ports 1a of the intercooler 1 which is connected to outlet ports 7b of the low pressure cylinder 7. Then, it is combined into one path inside the intercooler 1 and it goes from exit port 1b to inlet ports 8a of the high pressure cylinder 8. At this time, to flow out of a drain which is necessary because the compressed air is cooled in the intercooler 1 and, therefore, inlet ports 1a should be placed in as high a position as possible. The exit port 1b should be placed in as low a position as possible. Also, to recover the drain which flows out from exit 1b, there is a drain separator 9 located in the piping between exit port 1b of the intercooler 1 and inlet ports 8a of the high pressure cylinder 8. The drain separator prevents the drain from flowing into the oil tank (not shown in the FIGS.) after passing the high pressure cylinder 8. However, this drain separator 9 is not necessary when it is used in a place where the temperature and/or humidity are low. The air which enters from inlet ports 8a of the high pressure cylinder 8 is compressed further and travels from the outlet ports 8b to the inside of the aftercooler 2 via the inlet port 2a of the aftercooler 2. After circulating inside the aftercooler 2, it goes from the outlet port 2b to the brake system of the railroad car (not shown in the FIGS.). During this time, compressed air flow through the inlet port 2a and the outlet port 2b of the aftercooler 2 are in the same direction as the inlet port 1a and the outlet port 1b of the intercooler 1. Therefore, the compressed air which moves inside the intercooler 1 and the air flow which moves inside the aftercooler 2 flow in the same direction so that there is little, if any, heat transfer between the coolers and a more efficient and balanced cooling effect is obtained.

Therefore, it is relatively hot in the vicinity of each of the inlet ports 1a and 2a of the intercooler 1 and the aftercooler 2 which are placed side by side; it is relatively cool in the vicinity of each of the outlet ports 1b and 2b so that greater effectiveness of the forced air cooling of the fan 6 is realized. Thus, the intimate heat transfer ratio of the intercooler 1 and the aftercooler 2 of the integral cooler unit 3 relative to the dividing line 10 is about 2.5 since the after cooler after cooler 2 is larger. This is the result of the high pressure and high temperature of the compressed air which enters the aftercooler 2 and, therefore, the cooling efficiency must be considered in relation to the heat effect that may occur on the brake system. It is for this reason that the aftercooler 2 is normally placed under the intercooler 1. The fan 6 fixed on the outboard end of the drive shaft 5 of the motor 4 is installed inside the motor 4 so that it blows the air from the motor side 4 to the cooler unit 3 sideways direction. Therefore, the cooling air enters the inlet chutes 12 provided on the inner side of the output shaft 11 of the motor 4 and passes through the inside of the motor 4. Thus, the air flow cools down the motor 4 whereupon it enters the cooler unit 3. The second embodiment shown in FIGS. 2a-2c is the substantially same as the first embodiment of FIGS. 1a-1c except that the intercooler 1 and the aftercooler 2 are placed on the right and left sides in side by side relationship. Therefore, no further detailed explanation is believed to be necessary.

In the third embodiment shown in FIGS. 3a–3c, the direction in which the air flow that is moved by the fan 6 is in the opposite direction to that shown in the first and second embodiments. The remaining structures except for the air scoop which directs the movement of air are the same as in the first embodiment. Therefore, only the differences have been explained, and the rest has been omitted for the purpose of convenience. Specifically, the cooling air is sucked into the outboard side of the cooler unit 3 by the rotation of the fan 6 passing through the wind channel or air scoop 13 which is located in the outer peripheral sides of the motor 4. The cooling air is discharged or exhausted on the outer sides of the output shaft 11 of the motor 4. The low pressure cylinder 7 and the high pressure cylinder 8 of the two-stage compressor unit 14 are located in this exhaust stream; therefore, this unique cooling effect is different from that of first and second embodiments. The suction dust filter 18 and the suction muffler 19 are located on the same side at a lower location.

As is clear from the above explanation, in the two-stage air compressor unit of this invention, the intercooler and the aftercooler are placed side by side so that the inlet and outlet directions are the same so that it is possible to make them into a one-piece or integral cooler unit. Thus, the integral 3 cooler unit is located on the outboard side of the drive shaft of the motor 4. The fan 6 is securely fixed on the drive shaft of the motor 4 to provide forced air cooling of the aftercooler as well as the intercooler. Therefore, the cooling efficiency is increased and the size of the entire compressor system can be significantly reduced. Thus, the system is made much more economical to operate and maintain. Also, since the intercooler is not located in the vicinity of the two-stage compressor like the systems of the prior art, the cooling efficiency can dramatically be improved. And also, as a result of the improved cooling ability, the compressing efficiency of the two-stage compressor improves and the temperature rise of the compressor is prevented, so that the lubricating oil can last longer. The durability of the mechanical parts improves and oil consumption can be decreased.

The following is a numerical listing of the various parts used in the present invention.
1. Intercooler
2. Aftercooler
3. Cooler Unit
4. Motor
5. Drive Shaft
6. Fan
7. Low Pressure Cylinder
7b. Outlet Port
8. High Pressure Cylinder
8a. Inlet Port
8b. Outlet Port
11. Motor Output Shaft
14. Two-stage Compressor
15. Compressor Shaft Thus, the present invention has been described in such full, clear, concise and exact terms as to enable any person skilled in the art to which it pertains to make and use the same, and having set forth the best modes contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiments of the invention may be made by those skilled in the art without departing from the spirit and scope of the invention as set forth in the appended claims.

We claim:

1. A two-stage air compressor unit comprising, an intercooler and an aftercooler placed in intimate contact relationship to each other, the inlets of the intercooler and aftercooler are located on one axial end thereof and the outlets of the intercooler and aftercooler are located on the opposite axial end thereof so that air flow through the intercooler and the aftercooler is in the same direction to minimize heat transfer between the intimately contacting intercooler and the aftercooler, the intercooler and the aftercooler are combined into one piece as an integral cooler unit, a motor, a fan driven by said motor, the cooler unit is installed on the outboard side of the motor and is force air cooled by said fan driven by the motor, the fan is fixed to the drive shaft of the motor, a compressoir unit is coupled with the motor, the compressor includes a low pressure cylinder and a high pressure cylinder, the intercooler is connected to the outlet port of the low pressure cylinder and the suction inlet port of the high pressure cylinder to provide a source of high pressure air.

2. The two-stage air compressor unit as defined in claim 7, wherein the intercooler is mounted on the side of the aftercooler.

3. The two-stage air compressor unit as defined in claim 1, wherein the intercooler is mounted in contiguous relationship on top of the aftercooler.

4. The two-stage air compressor unit as defined in claim 1, wherein the fan draws cooling air through the motor to cool the intercooler and aftercooler.

5. The two-stage air compressor unit as defined in claim 1, wherein the fan draws cooling air from the outboard side of the intercooler and aftercooler and passes it along the outside of the motor.

6. The two-stage air compressor unit as defined in claim 1, wherein the intercooler has an inlet port which is on the same end as an inlet port of the aftercooler and the intercooler has an outlet port which is on the same end as an outlet port of the aftercooler so that little, if any, heat transfer occurs between the intercooler and aftercooler.

* * * * *

UNITED STATES PATENT AND TRADEMARK OFFICE
CERTIFICATE OF CORRECTION

PATENT NO. : 4,830,580

DATED : May 16, 1989

INVENTOR(S) : Yasuhisa Hata and Satoshi Ogura

It is certified that error appears in the above-identified patent and that said Letters Patent is hereby corrected as shown below:

Column 6, line 27, delete "the" (second occurrence).

Signed and Sealed this

Sixth Day of February, 1990

*Attest:*

JEFFREY M. SAMUELS

*Attesting Officer*     *Acting Commissioner of Patents and Trademarks*